United States Patent
Gay

(10) Patent No.: US 7,852,865 B2
(45) Date of Patent: Dec. 14, 2010

(54) SYSTEM AND METHOD FOR PREFERRED SERVICE FLOW OF HIGH PRIORITY MESSAGES

(75) Inventor: Dan Gay, Lawrenceville, GA (US)

(73) Assignee: Broadcom Corporation, Irvine, CA (US)

( * ) Notice: Subject to any disclaimer, the term of this patent is extended or adjusted under 35 U.S.C. 154(b) by 1331 days.

(21) Appl. No.: 10/303,952

(22) Filed: Nov. 26, 2002

(65) Prior Publication Data

US 2004/0100906 A1 May 27, 2004

(51) Int. Cl.
*H04L 12/56* (2006.01)
*H04L 12/54* (2006.01)

(52) U.S. Cl. ........................................ 370/412; 370/429

(58) Field of Classification Search ................ 370/230, 370/235, 389, 392, 395.7, 412, 429, 428, 370/413, 415, 416, 417, 418, 414; 710/48, 710/22, 36, 40, 52, 56, 58, 59, 53, 54; 711/117, 711/129, 147, 151, 152, 158, 100, 154
See application file for complete search history.

(56) References Cited

U.S. PATENT DOCUMENTS

| | | | |
|---|---|---|---|
| 6,118,797 A * | 9/2000 | O'Shea | 370/524 |
| 6,408,324 B1 * | 6/2002 | Wallace et al. | 718/107 |
| 6,427,180 B1 * | 7/2002 | Bastian et al. | 710/112 |
| 6,542,950 B1 * | 4/2003 | Bodnar | 710/260 |
| 6,940,864 B2 * | 9/2005 | Abdelilah et al. | 370/412 |
| 7,127,507 B1 * | 10/2006 | Clark et al. | 709/224 |
| 7,151,744 B2 * | 12/2006 | Sarkinen et al. | 370/230 |
| 2003/0189900 A1 * | 10/2003 | Barany et al. | 370/229 |
| 2004/0001499 A1 * | 1/2004 | Patella et al. | 370/412 |
| 2004/0213156 A1 * | 10/2004 | Smallwood et al. | 370/232 |

* cited by examiner

*Primary Examiner*—Aung S Moe
*Assistant Examiner*—Feben Haile
(74) *Attorney, Agent, or Firm*—Sterne, Kessler, Goldstein & Fox P.L.L.C.

(57) ABSTRACT

A system and method for preferred service flow of high priority messages between electronic devices is provided. The preferred service flow system includes preferred service flow queues, standard service flow queues, request/grant state machines and a controller. The method includes determining whether the standard processing rate of messages is acceptable, creating a preferred service flow queue and processing a high priority message through the preferred service flow queue. A preferred service flow queue will be created and the message processed using that queue when the standard processing rate is unacceptable and resources are available for the preferred service flow queue. If the standard processing rate is acceptable or resources are unavailable, a preferred service flow queue will not be created and the high priority message will be processed using the standard procedure for processing a message.

15 Claims, 3 Drawing Sheets

SYSTEM AND METHOD FOR PREFERRED SERVICE FLOW OF HIGH PRIORITY MESSAGES

BACKGROUND OF THE INVENTION

1. Field of the Invention

The invention relates to the processing of messages used in communications systems, and more particularly, to providing a preferred service flow for high priority messages.

2. Background of the Invention

In the last several years distributed computing and communications systems that rely on or provide high speed data communications have become nearly ubiquitous. Such systems may include, but are not limited to, broadband communication systems using cable modems, satellite communication systems, fiber to the home (FTTH) communications networks, and board-to-board interconnections in a myriad of electronic devices.

Electronic devices within a communication system exchange a variety of message types. While there are many ways to characterize message types, one approach is to characterize messages as service or control messages. Service messages can be defined as those messages that contain information being used by an end user. For example, one type of service message may carry data related to a website on the Internet. The data is provided to a computer that displays the website for an end user's use. Control messages, on the other hand, can be defined as those messages that contain information that allows one electronic device to manage or be aware of the actions of another electronic device. For example, control messages may carry system status indications, synchronization information or other system management instructions.

Typically, some messages—whether, service or control— have a higher processing priority than other messages. In the case of service messages, for example, a message that contains data used to display a website may have a lower processing priority than a message than contains data associated with a voice over Internet Protocol (VoIP) conversation. If the processing of a message containing website data was delayed for a fraction of a second, the end user would most likely not notice any effect. Whereas, even a fraction of second delay in processing and transmitting a VoIP message may lead to degradation in the audible quality of the voice conversation. Thus, in terms of processing the messages, a VoIP service message would have a higher priority than the website service message.

Similarly, it may be more important to process certain control messages more quickly than service messages or other control messages. For example, a control message that instructs a device to take an action within a particular time (such that, otherwise, no further data transmission can occur) would be a high priority message that should be processed ahead of other messages.

A specific example relates to messages used in a broadband cable modem communications network. In a broadband communications network that uses cable modems, typically many cable modems are connected to a single cable modem termination system (CMTS). Cable modems are located at customer premises and typically connected to personal computers through an Ethernet connection. CMTSs are typically located within a service provider's network center, often known as a headend location. CMTSs exchange data with multiple cable modems at high speeds.

One type of control message used in a broadband cable modem communications network is a Dynamic Channel Change Request (DCC-REQ) control message. A CMTS transmits a DCC-REQ control message to direct a cable modem to change its upstream (from cable modem to CMTS) channel and/or its downstream (from CMTS to cable modem) channel that it is using for data transmission. The CMTS may launch a DCC-REQ for traffic balancing, noise avoidance or other reasons. In most situations, the CMTS that transmits a DCC-REQ will expect to receive a response message, referred to as a DCC-RSP message, from a cable modem. The DCC-RSP control message provides information about the time the cable modem needs to execute the change, as well as other parameters.

In some cases, if the CMTS does not receive a DCC-RSP within a response time threshold, the cable modem will not be able to successfully move to the new channel. In this case, the ability of the cable modem to seamlessly switch channels and avoid a service interruption or degradation will be reduced. Unfortunately, when a cable modem is processing a large number of service messages, if the DCC-RSP message is processed normally, that is, without priority over any other messages, it can exceed the response time threshold, and service interruption or degradation can occur.

FIG. 1 illustrates a standard service flow system 100 that is typically used to manage, process and transmit messages from one device to another device, for example, from a cable modem to a CMTS. Standard service flow system 100 can exist in an electronic device, such as a cable modem. Standard service flow system 100 includes standard service flow queues 110, 120 and 130, request/grant state machines 140, 150, and 160, and controller 170.

Each queue 110, 120, and 130 has a request/grant state machine that is associated with the particular queue. For example, standard service flow queue 110 is associated with and electrically coupled to request/grant state machine 140. Although the example illustrates only three standard service flow queues for ease of illustration, any number of standard service flow queues can be used.

The standard service flow queues 110, 120, and 130 are used to accumulate messages that are being processed for transmission to another device. When a message is provided to standard service flow system 100, controller 170, which can be a direct memory access (DMA) controller, places the message into one of the queues. When a message moves to the top of a standard service flow queue, the message is made available to an input/output bus for transmission to another device by an indication being provided to a request/grant state machine.

When a device, such as a cable modem, is transmitting many messages the queues may be full. As a result, the time it takes for a message to move from the bottom of a queue to being transmitted can be greater than response time thresholds for which a CMTS expects to receive a response to a control message. As discussed above, if a response time threshold is exceeded this may result in performance degradation or system shut-down.

What is needed is a system and method to cost-effectively provide preferred service flow processing of messages that ensures high priority messages are provided preferred processing over lower priority messages to expedite high priority message processing.

SUMMARY OF THE INVENTION

The invention is directed to a system and method for preferred service flow of high priority messages. The preferred service flow system is contained within an electronic device and includes a preferred service flow queue, standard service flow queues, request/grant state machines and a controller. The method includes determining whether the standard processing rate of messages is acceptable, creating a preferred service flow queue and processing a high priority message through the preferred service flow queue. A preferred service flow queue will be created and the message processed using that queue when the standard processing rate is unacceptable. If the standard processing rate is acceptable, a preferred service flow queue will not be created and the high priority message will be processed using the standard procedure for processing a message.

A DCC-RSP is one example of a high priority message. Other high priority messages can be defined for a particular system or application. In general, however, a high priority message is one that may cause system or service performance to be degraded if it is not processed in a timely manner.

In one embodiment of the invention, the electronic device is a cable modem. In this embodiment, the preferred service flow system and method are implemented within a cable modem to ensure that the cable modem processes a high priority message, such as a DCC-RSP within a response time threshold. As discussed above, when a cable modem receives a DCC-REQ, in some instances it must respond with a DCC-RSP within a response time threshold. A controller within a preferred service flow system in the cable modem determines whether a preferred service flow queue is needed. If a determination is made that a preferred service flow queue is needed, one will be created, provided that resources are available, and the DCC-RSP message will be processed through the preferred service flow queue.

Use of the invention provides significant benefits. First, in the absence of the invention, high priority messages, such as a DCC-RSP message, would be treated using normal procedures. Under these normal procedures, the processing time may exceed the time in which a CMTS expects to receive a message. As a result, service could degrade or be lost. Use of the invention would reduce the likelihood that such a result would occur.

Additionally, implementation of the invention will support higher quality levels required for services such as VoIP or video streaming. In the case of VoIP, for example, use of a preferred service flow system can increase the quality of service and reduce impairments, such as clicks in a conversation supported by a VoIP connection. High priority messages can be given preferred service flow treatment to reduce the probability of message delay that may lead to such impairments.

Finally, by creating temporary preferred service flow queues, rather than permanent queues, device hardware and memory resources can be shared among other applications for cost-effective use.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
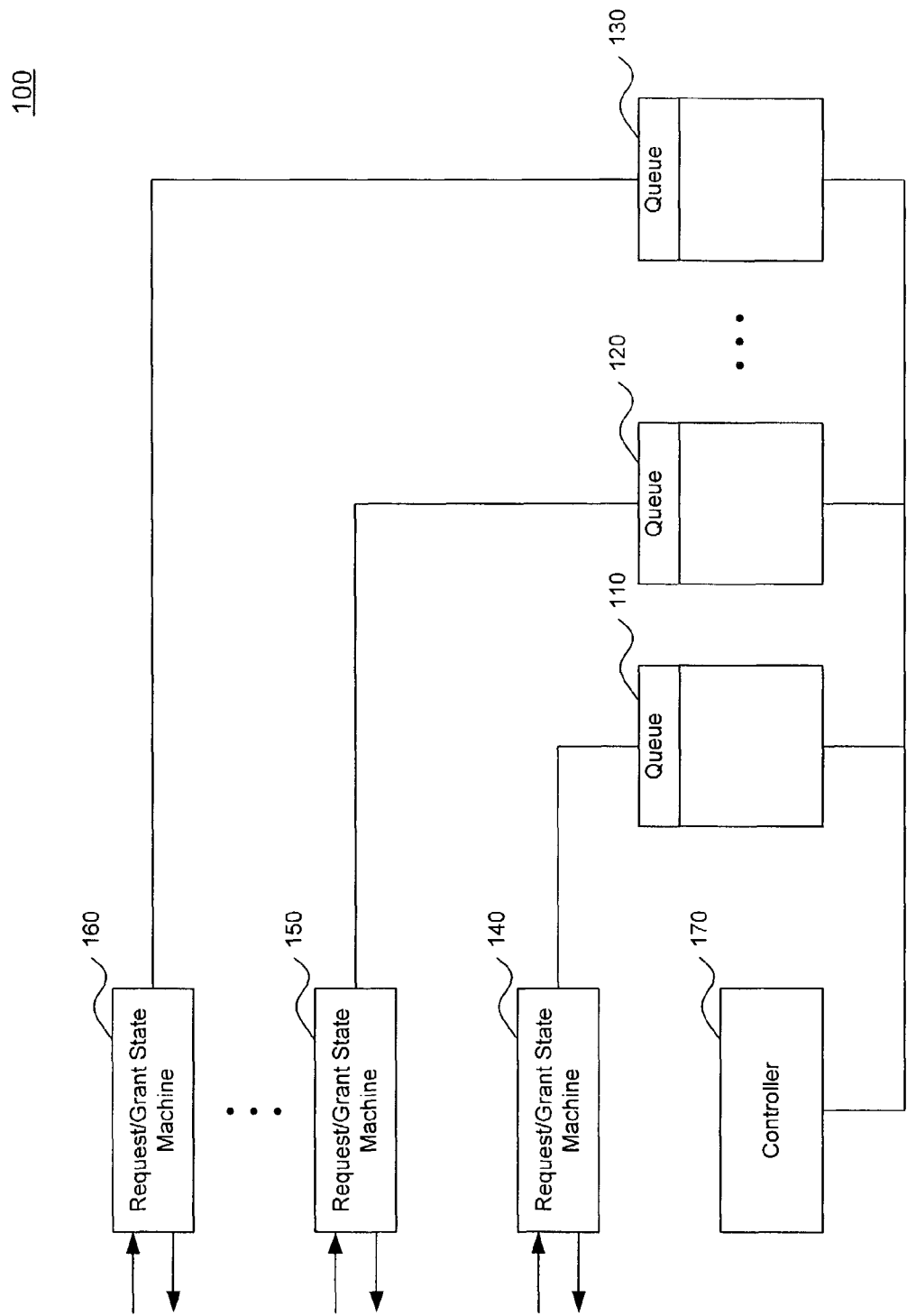
FIG. 1 is a diagram of a standard service flow system for processing messages.
Figure 2:
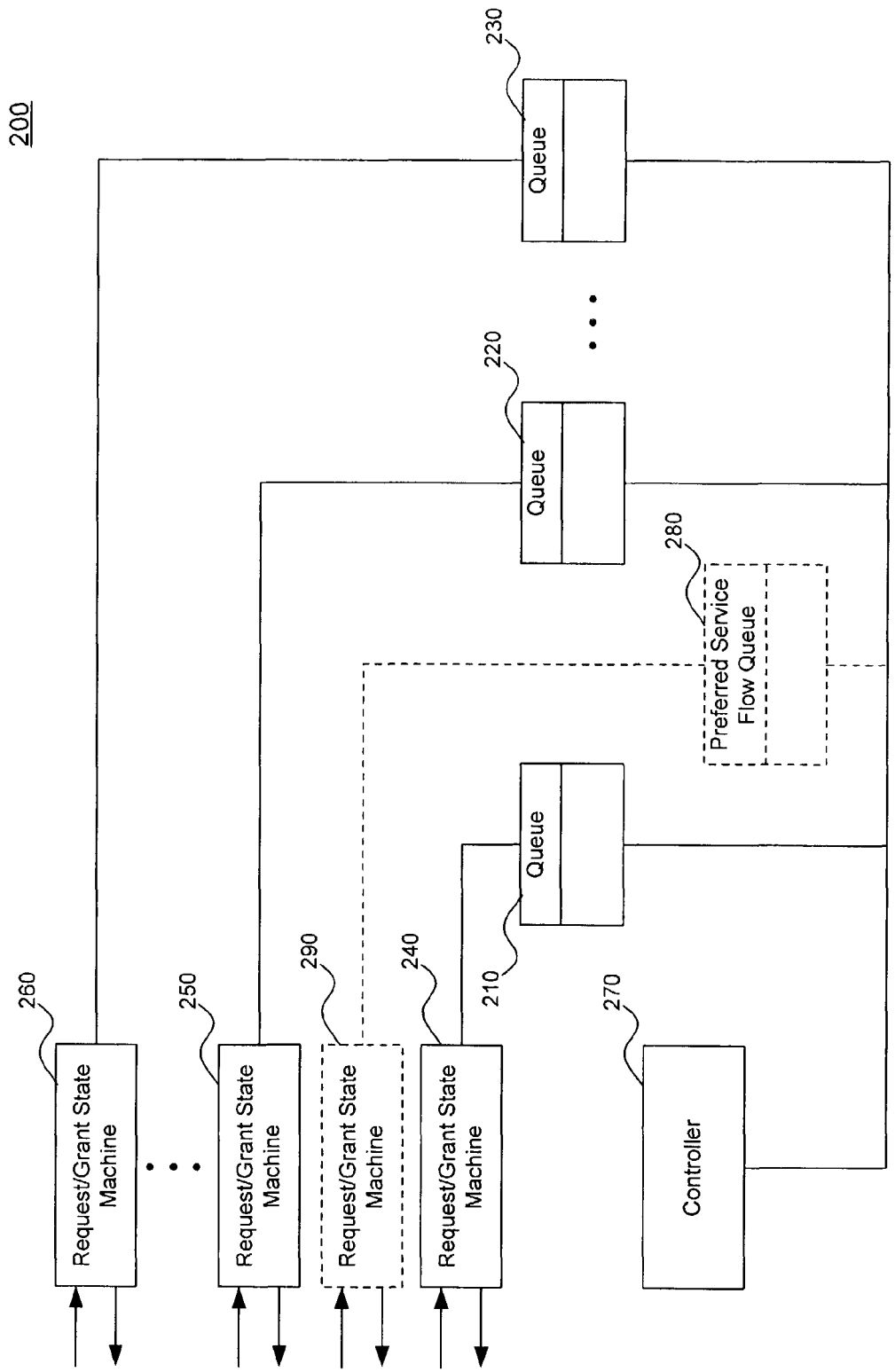
FIG. 2 is a diagram of a preferred service flow system for processing messages, according to an embodiment of the invention.

FIG. 2 illustrates preferred service flow system 200, according to an embodiment of the invention. Preferred service flow system 200 exists in an electronic device, such as a cable modem or CMTS. The system can be used to manage, process and transmit messages from one device to another device, for example, from a cable modem to a CMTS. Preferred service flow system 200 includes standard service flow queues 210, 220, and 230, controller 270, and preferred service flow queue 280. Controller 270 can be a DMA controller.

Each queue 210, 220, and 230 has a request/grant state machine that is associated with the particular queue. Standard service flow queue 210 is associated with and electrically coupled to request/grant state machine 240. Likewise, standard service flow queue 220 is associated with and electrically coupled to request/grant state machine 250. Standard service flow queue 230 is associated with and electrically coupled to request/grant state machine 260. Preferred service flow queue 280 is associated with and electrically coupled to request/grant state machine 290. Although the example illustrates only three standard service flow queues for ease of illustration, any number of standard service flow queues may be used.

Standard service flow queues 210, 220, and 230 are permanent queues that can be implemented in software, hardware, firmware or a combination of these. Likewise request/grant state machines 240, 250, and 260 are permanent and can be implemented in software, hardware, firmware or a combination of these. Standard service flow queues 210, 220 and 230 are used to accumulate messages that are being processed for transmission to another device. When a message moves to the top of a standard service flow queue, the message is made available for transmission to another device by being provided to a request/grant state machine. Controller 270 manages the queues and state machines. Additionally, controller 270 contains rules that determine when and how preferred service flow queue 280 should be created. Controller 270 may be implemented in software, hardware, firmware or a combination of these.

Preferred service flow queue 280 is a temporary queue that is created when controller 270 determines that a high priority message must be sent using an expedited procedure. When created, preferred service flow queue 280 temporarily takes over for a standard service flow queue that contains a high priority message that needs to be processed more quickly than if the message were to follow the normal operation. In an embodiment of the invention, preferred service flow queue 280 is created from resources that are currently not being used. Upon creation, preferred service flow queue 280 will be associated with a request/grant state machine, such as request/grant state machine 290, and will be given characteristics that are the same as those of the standard service flow queue that it temporarily replaces. Depending on the availability of idle resources, preferred service flow queue 280 may exist, but be inactive if resources are not needed elsewhere. Alternatively, preferred service flow queue 280 may only be created when specifically needed, provided that idle resources are available.

Figure 3:
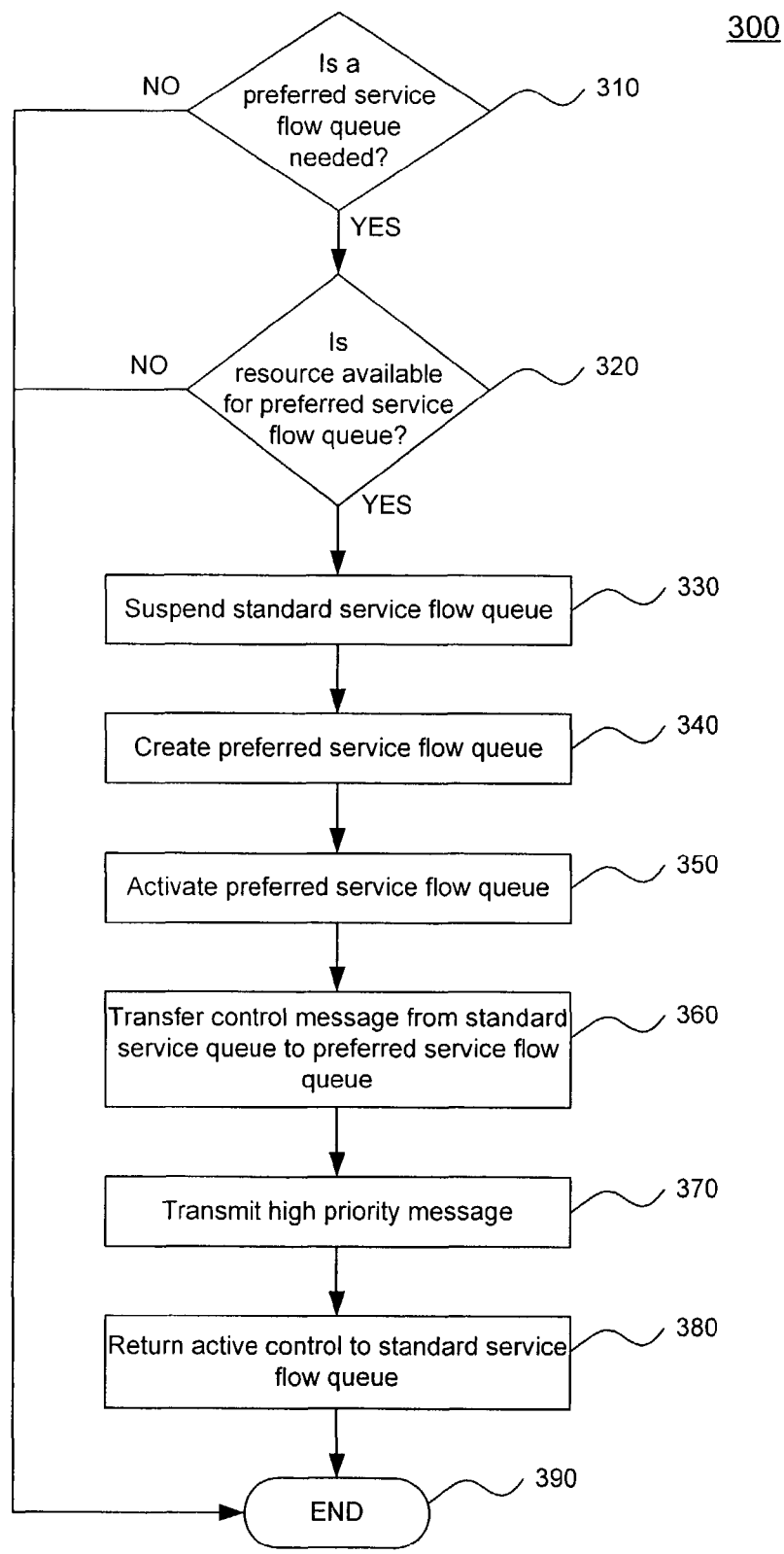
FIG. 3 is a method for preferred service flow of high priority messages, according to an embodiment of the invention.

The process illustrated in FIG. 3 provides a method for preferred service flow of high priority messages. The method begins in step 310. In step 310, a determination is made whether a preferred service flow queue is needed. If a determination is made that a preferred service flow queue is needed, the method proceeds to step 320. If a determination is made that a preferred service flow queue is not needed, the method proceeds to step 390 and ends.

In one embodiment, this determination may be made based on the type of message that enters a standard service flow queue. For example, in the case of a cable modem the controller supporting a preferred service flow method may be preset such that anytime a DCC-RSP message enters a standard service flow queue, a determination is made to create a preferred service flow queue. In another example, multiple factors may be considered to make the determination to create a preferred service flow queue. These factors may be that a message is of a certain type, for example, a control message or a service message supporting a VoIP conversation, and that the expected wait time on the existing standard queues is greater than a preset threshold.

In step 320, a determination is made as to whether resources are available to support the implementation of a preferred service flow queue. If a determination is made that insufficient resources are available, the method ends in step 390. In this case, no preferred service flow queue is implemented, and the processing of the high priority message proceeds without any preference. As a result, the end user may experience service degradation. If a determination is made that sufficient resources are available, the method proceeds to step 330.

In step 330, the operation of a standard service flow queue, such as standard service flow queue 210, is suspended. While suspended, additional messages can be added to the suspended standard service flow queue. However, no messages will be delivered from the suspended standard service flow queue to a state machine, such -as request/grant state machine 240. During the period when the standard service flow queue is suspended, messages in that queue remain in the queue, but are not processed.

In step 340, a preferred service flow queue is created. In step 350, the preferred service flow queue is activated to receive messages and to provide an indication to a request/grant state machine that the messages are to be transmitted to another device. The preferred service flow queue assumes the same characteristics of the standard service flow queue that it is temporarily replacing. In one embodiment object oriented programming can be used to create the preferred service flow queue. In this case, the objects for the suspended standard service flow queue and the preferred service flow queue can be the same.

In step 360, the high priority message is transferred from the suspended standard service flow queue and placed into the preferred service flow queue. In effect, this action places the high priority message at the top of a queue, so it will be processed quickly.

In step 370, the high priority message is processed and transmitted. In step 380, active control is returned to the standard service flow queue by suspending the operation of the preferred service flow queue and reactivating the standard service flow queue that was previously suspended. In one embodiment, the resources used for the preferred service flow queue will be released and the preferred service flow queue eliminated. In another embodiment, where resources may not be immediately needed, the preferred service flow queue will remain, but be inactive until another high priority message needs to be transmitted.

CONCLUSION

An exemplary embodiment of a preferred service flow system and method has been presented. The invention is not limited to this example. This example is presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A preferred service flow system for accelerating the processing of a high priority message that is to be transmitted from an electronic device, comprising:
 (a) a standard service flow queue;
 (b) a controller for managing said standard service flow queue and a preferred service flow queue,
  wherein the controller dynamically creates the temporary preferred service flow queue when a determination is made that the high priority message needs to be processed using an expedited procedure, wherein an operation of the standard service flow queue is suspended before the creation of the temporary preferred service flow queue and the temporary preferred service flow queue is activated, wherein the high priority message is transferred from the standard service flow queue to the temporary preferred service flow queue, and wherein the high priority message is removed from the standard flow queue.

2. The preferred service flow system of claim 1, wherein the electronic device is a cable modem.

3. The preferred service flow system of claim 1, wherein the electronic device is a cable modem termination system.

4. The preferred service flow system of claim 1, wherein the determination that the high priority message needs to be processed using an expedited procedure is made based on type of the message.

5. The preferred service flow system of claim 1, wherein the determination that the high priority message needs to be processed using an expedited procedure is made based on that expected wait time on the standard service flow queue is greater than a threshold.

6. A preferred service flow method for transmitting a high priority message from an electronic device, comprising:
 (a) determining whether processing rate of messages is acceptable;
 (b) if the processing rate is unacceptable,
  (i) suspending an operation of a standard service flow queue,
  (ii) creating a temporary preferred service flow queue, wherein the creation of the temporary preferred service flow queue occurs after the suspension of the operation of the standard service flow queue,
  (iii) activating the temporary preferred service flow queue,
  (iv) transferring the high priority message from the standard service flow queue to the temporary preferred service flow queue, wherein the high priority message is removed from the standard service flow queue, and (v) processing the high priority message through the preferred service flow queue.

7. The method of claim 6, wherein the electronic device is a cable modem.

8. The method of claim 6, wherein the electronic device is a cable modem termination system.

9. The method of claim 6, wherein the high priority message is a DCC-RSP message.

10. The method of claim 6, wherein the high priority message is a VoIP message.

11. The method of claim 6, wherein step (b) further comprises:

(vi) transferring control from the standard service flow queue to the temporary preferred service flow queue; and (vii) transmitting the high priority message from the temporary preferred service flow queue.

12. The method of claim 6, wherein the determining whether the processing rate of the messages is acceptable is based on:

type of the messages; and that expected wait time on a standard service flow queue is greater than a threshold.

13. The method of claim 11, wherein step (b) further comprises:

(viii) returning the control from the temporary preferred service flow queue to the standard service flow queue.

14. The method of claim 13, wherein step (b) further comprises:

(ix) eliminating the temporary preferred service flow queue.

15. The method of claim 13, wherein step (b) further comprises:

(ix) inactivating the temporary preferred service flow queue.

* * * * *

UNITED STATES PATENT AND TRADEMARK OFFICE
CERTIFICATE OF CORRECTION

| | | |
|---|---|---|
| PATENT NO. | : 7,852,865 B2 | Page 1 of 1 |
| APPLICATION NO. | : 10/303952 | |
| DATED | : December 14, 2010 | |
| INVENTOR(S) | : Dan Gay | |

It is certified that error appears in the above-identified patent and that said Letters Patent is hereby corrected as shown below:

Column 8, line 17, "(xi)" should be replaced with --(x)--.

Signed and Sealed this
Eighth Day of March, 2011

David J. Kappos
*Director of the United States Patent and Trademark Office*